US011772451B2

(12) United States Patent
Bauer

(10) Patent No.: US 11,772,451 B2
(45) Date of Patent: Oct. 3, 2023

(54) VEHICLE TEMPERATURE CONTROL SYSTEM

(71) Applicant: Eberspächer Climate Control Systems GmbH & Co. KG, Esslingen (DE)

(72) Inventor: Thomas Bauer, Dettingen (DE)

(73) Assignee: EBERSPÄCHER CLIMATE CONTROL SYSTEMS GMBH, Esslingen Am Neckar (DE)

( * ) Notice: Subject to any disclaimer, the term of this patent is extended or adjusted under 35 U.S.C. 154(b) by 431 days.

(21) Appl. No.: 16/997,433

(22) Filed: Aug. 19, 2020

(65) Prior Publication Data

US 2021/0061057 A1    Mar. 4, 2021

(30) Foreign Application Priority Data

Aug. 26, 2019    (DE) ...................... 10 2019 122 810.7

(51) Int. Cl.
*B60H 1/00*    (2006.01)
*B60H 1/22*    (2006.01)

(52) U.S. Cl.
CPC ..... *B60H 1/00328* (2013.01); *B60H 1/00492* (2013.01); *B60H 1/00571* (2013.01);
(Continued)

(58) Field of Classification Search
CPC ............ B60H 1/00328; B60H 1/00492; B60H 1/00571; B60H 1/2209; B60H 1/2221; B60H 2001/2271; B60H 1/00921; B60H 1/2212; B60H 2001/00928; B60H 2001/00949; B60H 2001/2284; B60H 2001/2293; F23D 2900/21002;
(Continued)

(56) References Cited

U.S. PATENT DOCUMENTS 3,758,031 A * 9/1973 Moran ................. B60H 1/2209
123/142.5 R
5,291,960 A * 3/1994 Brandenburg ........ B60W 10/26
123/41.14
(Continued)

FOREIGN PATENT DOCUMENTS

CA        2621751 A1 *  8/2008   ......... B60H 1/00907
DE     197 20 895 A1    11/1997
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A vehicle temperature control system, for electric motor-powered vehicles or hybrid vehicles, includes a heater (18), which can be operated electrically or/and with fuel, with a first heat exchanger device (16) for transferring heat provided in the heater (18) to a first heat carrier medium provided in a first heat carrier medium circuit (12). An operating material tank (20) holds a liquid operating material (24). A second heat exchanger device (26) provides heat transfer between the first heat carrier medium provided in the first heat carrier medium circuit (12) and energy storage material (36) contained in the operating material tank (20). A third heat exchanger device (38) provides heat transfer between the first heat carrier medium provided in the first heat carrier medium circuit (12) and a second heat carrier medium provided in a second heat carrier medium circuit (40).

20 Claims, 2 Drawing Sheets

(52) U.S. Cl.
CPC ......... *B60H 1/2209* (2013.01); *B60H 1/2221* (2013.01); *B60H 2001/2271* (2013.01)

(58) Field of Classification Search
CPC . F23D 2900/31022; F23D 2900/03092; F23D 2900/03322; B60K 2015/03348; B60K 2015/03427; B60S 1/487
USPC .......................................... 237/12.3 B, 12.3 C
See application file for complete search history.

(56) References Cited

U.S. PATENT DOCUMENTS

| | | | | |
|---|---|---|---|---|
| 6,078,107 | A * | 6/2000 | Kahnau | B60H 1/2209 |
| | | | | 219/202 |
| 10,946,713 | B2 * | 3/2021 | Seki | B60H 1/00328 |
| 11,407,283 | B2 * | 8/2022 | Andrews | B60H 1/00378 |
| 2015/0183296 | A1 * | 7/2015 | Ragazzi | B60H 1/034 |
| | | | | 219/205 |
| 2019/0275858 | A1 * | 9/2019 | Seki | B60H 1/32281 |
| 2020/0369108 | A1 * | 11/2020 | Kim | B60H 1/00007 |
| 2020/0398645 | A1 * | 12/2020 | He | F25B 41/26 |

FOREIGN PATENT DOCUMENTS

| | | | | |
|---|---|---|---|---|
| DE | 19720895 A1 | * | 11/1997 | ......... B60H 1/00492 |
| DE | 10 2007 045 161 A1 | | 4/2009 | |
| DE | 102007045161 A1 | * | 4/2009 | ............ C09K 5/063 |
| DE | 10 2012 209 209 A1 | | 12/2013 | |
| DE | 102012209209 A1 | * | 12/2013 | ............. B60H 1/005 |
| DE | 102019107756 A1 | * | 10/2020 | ............. B60H 1/005 |
| JP | 62110515 A | * | 11/1985 | ......... B60H 1/00378 |
| JP | 62120215 A | * | 11/1985 | ........... F28D 20/003 |
| JP | 10071844 A | * | 3/1998 | ......... B60H 1/00392 |
| JP | 2012124222 A | * | 6/2012 | ........... B60H 1/2221 |
| JP | 2019130981 A | * | 8/2019 | ......... B60H 1/00328 |
| JP | 2022520595 A | * | 10/2019 | .............. F25B 27/02 |

* cited by examiner

VEHICLE TEMPERATURE CONTROL SYSTEM

CROSS REFERENCE TO RELATED APPLICATIONS

This application claims the benefit of priority under 35 U.S.C. § 119 of German Application 10 2019 122 810.7, filed Aug. 26, 2019, the entire contents of which are incorporated herein by reference.

TECHNICAL FIELD

The present invention pertains to a vehicle temperature control system, which can be used especially preferably in electric motor-powered vehicles and in hybrid vehicles as well.

TECHNICAL BACKGROUND

In order to provide the thermal energy necessary for heating the vehicle in such vehicles, which have, in general, no or only a comparatively small fuel tank, it is known that heat pump systems can be used, which, operated electrically, can transfer heat to the air to be introduced into the interior of the vehicle in a heating operating mode and can absorb heat from the air to be introduced into the interior of the vehicle in a cooling mode. Such heat pump systems can operate with a comparatively high efficiency in a temperature range between 0° C. and 20° C. However, the efficiency decreases at markedly lower or higher ambient temperatures. The use of heaters operated with fuel, for example, gasoline or diesel, requires the presence of a fuel tank and is often undesired because of the pollutant emission and the increasing requirements imposed on the environmental friendliness of vehicles.

SUMMARY

An object of the present invention is to provide a vehicle temperature control system, which can be operated with high efficiency and low environmental impact.

This object is accomplished according to the present invention by a vehicle temperature control system, especially for electric motor-powered vehicles or hybrid vehicles, comprising:
  a heater that can be operated electrically or/and with fuel with a first heat exchanger device for transferring heat provided in the heater to a first heat carrier medium provided in a first heat carrier medium circuit,
  an operating material tank for holding a liquid operating material,
  a second heat exchanger device for transferring heat between the first heat carrier medium provided in the first heat carrier medium circuit and energy storage material contained in the operating material tank, and
  a third heat exchanger device for transferring heat between the first heat carrier medium provided in the first heat carrier medium circuit and a second heat carrier medium provided in a second heat carrier medium circuit.

Unlike in conventional vehicle temperature control systems, in which the first heat carrier medium heated in a heater is used, in general, to heat the air to be introduced into the interior of a vehicle directly, the first heat carrier medium circuit in the configuration according to the present invention establishes a thermal connection between the second heat carrier medium circulating in the second heat carrier medium circuit and an energy storage material provided in the operating material tank. Heat can thus be absorbed when needed from the energy storage material in the first heat carrier medium and transferred to the second heat carrier medium or heat can be removed from the second heat carrier medium and stored in the energy storage material. In addition, the heater may be used to provide heat in order to transfer this heat via the first heat carrier medium to the second heat carrier medium or to store it in the energy storage material. The energy storage material thus forms a buffer, which allows an efficient temperature control operation of a system comprising the second heat carrier medium circuit even at comparatively high or comparatively low ambient temperatures.

In order to make it possible to build up a circulation of the first heat carrier medium in the first heat carrier medium circuit, this heat carrier medium circuit may comprise a heat carrier medium pump for delivering the first heat carrier medium through the first heat exchanger device, the second heat exchanger device and the third heat exchanger device.

An especially efficient operating characteristic can be achieved if the energy storage material comprises operating material contained in the operating material tank. The second heat exchanger device may comprise here a first heat exchanger area for transferring heat between the first heat carrier medium and the operating material contained in the operating material tank. The operating material, which can also be used in a vehicle in another manner, which will be explained later, can thus also assume at the same time the function of an energy storage device.

A phase change material energy storage device may be provided in the operating material tank in the vehicle temperature control system according to the present invention, wherein the energy storage material comprises phase change material provided in the phase change material energy storage device. In order to make a thermal interaction possible between the phase change material and the first heat carrier medium, the second heat exchanger device may comprise here a second heat exchanger area for transferring heat between the first heat carrier medium and the phase change material.

In order to make it possible to use operating material contained in the operating material tank in a vehicle, an operating material pump may be provided in an operating material line
  for delivering operating material contained in the operating material tank as a fuel to a burner area of the heater, or/and
  for delivering operating material contained in the operating material tank as a wiper fluid additive to a wiper fluid tank, or/and
  for delivering operating material contained in the operating material tank as a fuel additive to a fuel tank for an internal combustion engine.

Depending on the vehicle in which such a vehicle temperature control system shall be used, the operating material can thus be used as a fuel in the heater or as an additive for the wiper fluid in a vehicle in order, for example, to protect this liquid from freezing during operation in the winter. The operating material may also be used as an additive in the fuel to be burned in an internal combustion engine, for example, in a hybrid vehicle, which can contribute to a reduction of the pollutant emission.

In order to make it possible to supply these different system areas of a vehicle with operating material, it is proposed that an operating material reversing valve be provided in the operating material line downstream of the operating material pump, the operating material reversing valve being configured optionally to establish a connection between the operating material line and the burner area of the heater or/and the wiper fluid tank or/and the fuel tank.

In a system that can be configured in a simple and cost-effective manner, which may also be used, for example, in an electric motor-powered vehicle, the heater may comprise an electrically energizable heating device for heating the first heat carrier medium in the first heat exchanger device. For example, the electrically energizable heating device may comprise a positive temperature coefficient (PTC) heating device.

A heat pump system may be associated with the second heat carrier medium circuit according to the principles of the present invention. The heat pump system may be configured, for example, to transfer heat from the second heat carrier medium to the first heat carrier medium in a cooling operation in the area of the third heat exchanger device or to absorb heat from the first heat carrier medium in the second heat carrier medium, for example, in a heating operation.

According to an especially advantageous aspect, the operating material contained in the operating material tank may be or contain ethanol. Ethanol is suitable for use as a fuel for a fuel-operated heater, and operation of such a heater with low pollutant emission can be guaranteed when ethanol is used as an operating material. By adding ethanol to the wiper fluid in a vehicle, the freezing point of said wiper fluid can be lowered and the risk of the wiper fluid freezing in the winter can thus be reduced. If a vehicle has an internal combustion engine as a drive assembly, ethanol may also be used as an additive that is to be added to the fuel for the internal combustion engine and can contribute to a marked reduction of the nitrogen oxide emission.

In order to make it possible to use the operating material tank efficiently as an energy storage device, it is further proposed that this be enclosed with an insulating material. Such insulating material may comprise, for example, fiber mat material or foamed material.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
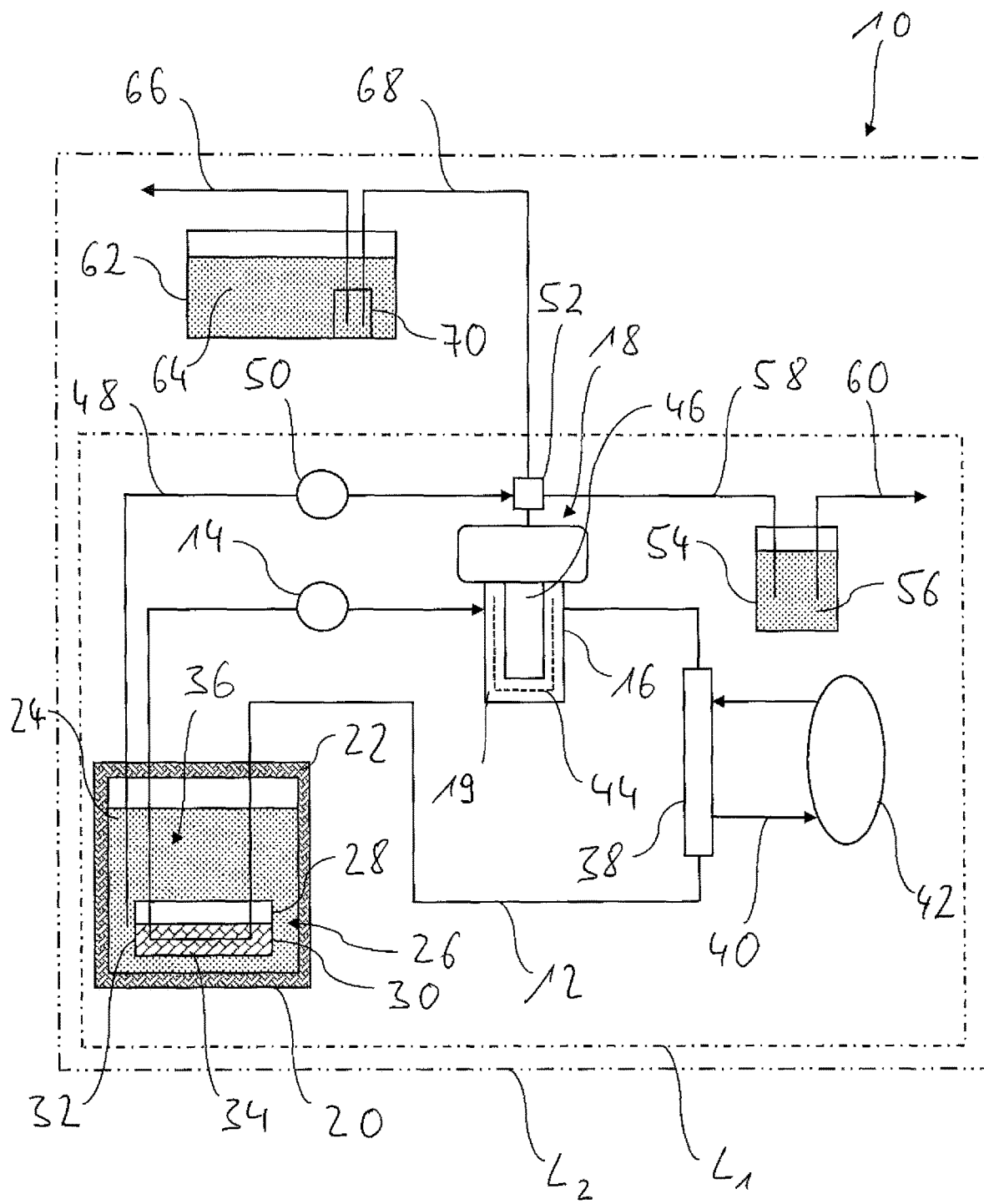
FIG. 1 is a schematic general view of the configuration of a vehicle temperature control system.

Referring to the drawings, a vehicle temperature control system is generally designated by 10 in FIG. 1. The vehicle temperature control system, which can be used in an especially advantageous manner in electric motor-powered vehicles or in hybrid vehicles, comprises as a central system area a first heat carrier medium circuit 12. Driven by a heat carrier medium pump 14, a liquid first heat carrier medium, for example, water or a liquid containing water circulates in the first heat carrier medium circuit 12. A first heat exchanger device of a heater 18, which heat exchanger device is generally designated by 16, is integrated into the first heat carrier medium circuit 12. The first heat carrier medium being delivered by the heat carrier medium pump 14 flows through a heat carrier medium flow space 19 of the first heat exchanger device 16 and can absorb heat generated in the heater 18 in the process.

The vehicle temperature control system 10 further comprises an operating material tank 20. The operating material tank 20 is preferably enclosed essentially completely by insulating material 22, so that liquid operating material 24 contained therein is heat-insulated to the outside. A second heat exchanger device 26, which is integrated into the first heat carrier medium circuit 12 and through which the first heat carrier medium being delivered by the heat carrier medium pump 14 can flow, is provided in the operating material tank 20.

The second heat exchanger device 26 comprises two heat exchanger areas 28, 30. The first heat exchanger area 28 is configured to establish a thermal interaction between the first heat carrier medium circulating in the first heat carrier medium circuit 12 and the operating material 24 contained in the operating material tank 20, i.e., for example, to transfer heat from the first heat carrier medium directly to the operating material 24. The second heat exchanger area 30 of the second heat exchanger device 26 is used to establish a thermal interaction between the first heat carrier medium and a phase change material 34 contained in a phase change material energy storage device 32, i.e., for example, to transfer heat from the first heat carrier medium to the phase change material 34. The phase change material energy storage device 32 can thus be used as a latent heat storage device and to store energy by bringing about a phase change in the phase change material 34 on heating said phase change material. Thus, both the operating material 24 contained in the operating material tank 20 and the phase change material 34 contained in the phase change material energy storage device 32 form in the exemplary embodiment shown in FIG. 1 an energy storage material 36 each, in which heat can be absorbed from the first heat carrier medium circulating in the first heat carrier medium circuit 12 and can be stored, and from which energy can thus be released.

It should be noted that the second heat exchanger device 26 could also be configured such that only a direct thermal interaction is generated in it between the first heat carrier medium and the operating material 24, while the phase change material 34 is then heated indirectly via the heated operating material 24 and it can release heat via the operating material 24. On the other hand, the second heat storage device 26 could also be configured such that essentially only a direct thermal interaction takes place in it between the first heat carrier medium and the phase change material 34. This material can provide now the energy storage material 36 alone, or it may contribute to the heating of the operating material by transferring heat to the operating material 24, so that the operating material 24 can also provide a part of the energy storage material 36. The operating material tank 20 could, in principle, also be configured without the phase change material energy storage device 32 provided in it, so that the second heat exchanger device 26 provides exclusively a thermal interaction between the first heat exchanger medium and the operating material 24 and the operating material 24 provides exclusively the energy storage material 36.

The first heat carrier medium circuit 12 further comprises a third heat exchanger device 38. The third heat exchanger device 38 is configured to provide a thermal interaction between the liquid first heat carrier medium circulating in the first heat carrier medium circuit 12 and a second heat carrier medium circulating in a second heat carrier medium circuit 40. It is thus possible to transfer heat from the first heat carrier medium to the second heat carrier medium or to transfer heat from the second heat carrier medium to the first heat carrier medium in the third heat exchanger device 38.

A heat pump system 42, which is indicated schematically in FIG. 1 and will be described in even more detail below with reference to FIG. 2 and via which heat can be transferred to the air to be introduced into interior of a vehicle or removed from this air, is associated with the second heat carrier medium circuit 40.

The heater 18 can be operated in the example shown both electrically and with fuel. The heater 18 comprises for this purpose an electrically energizable heating device 44, for example, a PTC heating device, around which the first heat carrier medium circulating in the first heat carrier medium circuit 12 can flow and transfer heat to this medium in the process. The heater 18 further comprises a burner area, generally designated by 46, which may be configured, for example, as a vaporizing burner and can burn a mixture of fuel and combustion air. The heat of combustion generated in the process can be transferred in the first heat exchanger device 16 to the first heat carrier medium.

The heater 18 uses the operating material contained in the operating material tank 20 as fuel. An operating material pump 50 is arranged for this purpose in an operating material line 48 leading away from the operating material tank 20. The operating material pump 50 delivers the operating material 24 in the direction of an operating material reversing valve 52 arranged close to the heater 18. The operating material reversing valve 52 may be switched, for example, such that it releases a flow path from the operating material line 48 to the burner area 46 of the heater 18, so that the operating material 24 being drawn off from the operating material tank 20 is fed into the burner area 46, is mixed there with combustion air delivered, for example, by a side channel blower or another combustion air blower and is burned to generate heat of combustion.

For example, pure ethanol (E100) may be used as the operating material 24 for an environmentally friendly operation of the heater 18. Such ethanol used as the fuel guarantees a combustion during which only low percentages of NOx, CO and HC are generated. For example, a three-way catalytic converter and a lambda probe may be associated with the heater 18, so that combustion can take place in a lambda range of 1 in the heater 18 while a lambda regulation is carried out.

The vehicle temperature control system 10 further comprises a wiper fluid container 54, in which wiper fluid 56 that can be used to clean the windshields of a vehicle, for example, water, may be stored. In case of the use of ethanol as an operating material 24, in particular, this may also be used to lower the freezing point of the wiper fluid 56 by adding it to said wiper fluid in order to thus prevent wiper fluid 56 being stored in the wiper fluid tank 54 from introduction during winter-time operation. The operating material reversing valve 52 may also be set for this purpose into such a position that operating material 24 can optionally be introduced into the wiper fluid tank 54 from the operating material line 48 via a supply line 58 by means of the operating material pump 50, and the wiper fluid 56 or a mixture of wiper fluid 56 and operating material 24 can be sent from said wiper fluid tank via another supply line 60 to a windshield wiper unit or to a headlight wiper unit of a vehicle.

The vehicle temperature control system 10 further comprises a fuel tank 62. Liquid fuel 64, for example, gasoline, which can be sent to an internal combustion engine via a supply line 66, may be stored in this fuel tank 62. Such a fuel tank 62 is present in a vehicle if this uses an internal combustion engine as a drive assembly or additional drive assembly in a hybrid vehicle. The operating material 24 may also be introduced into the fuel tank 62, preferably directly into a swirl pot 70, via the operating material reversing valve 52 and another supply line 68. Efficient mixing of fuel 64 and operating material 24 takes place there, so that the fuel 64 mixed with operating material 24 can be sent to the internal combustion engine. The addition of operating material 24 as an additive leads to a reduced pollutant emission of the internal combustion engine in this case as well, especially if ethanol is used as the operating material 24.

The operating material reversing valve 52 may be configured such that it establishes a connection of the operating material line 48 either with the heater 18 or with the wiper fluid tank 54 or with the fuel tank 62. It can thus be guaranteed that the necessary quantity of operating material 24 can be fed in a defined manner to the respective selected recipient in each of the connection states that can be set up in order thus to make it possible to provide the quantity of operating material 24 that is necessary for a desired heat output, for example, in the heater 18, as well as to provide the desired mixing ratio of wiper fluid 56 or fuel 64 and operating material 24 in the wiper fluid tank 54 as well as in the fuel tank 62 as well.

The heat pump system 42 suggested in FIG. 1, with which the air to be introduced into the interior of a vehicle can be thermally conditioned, will be described below with reference to FIG. 2.

Figure 2:
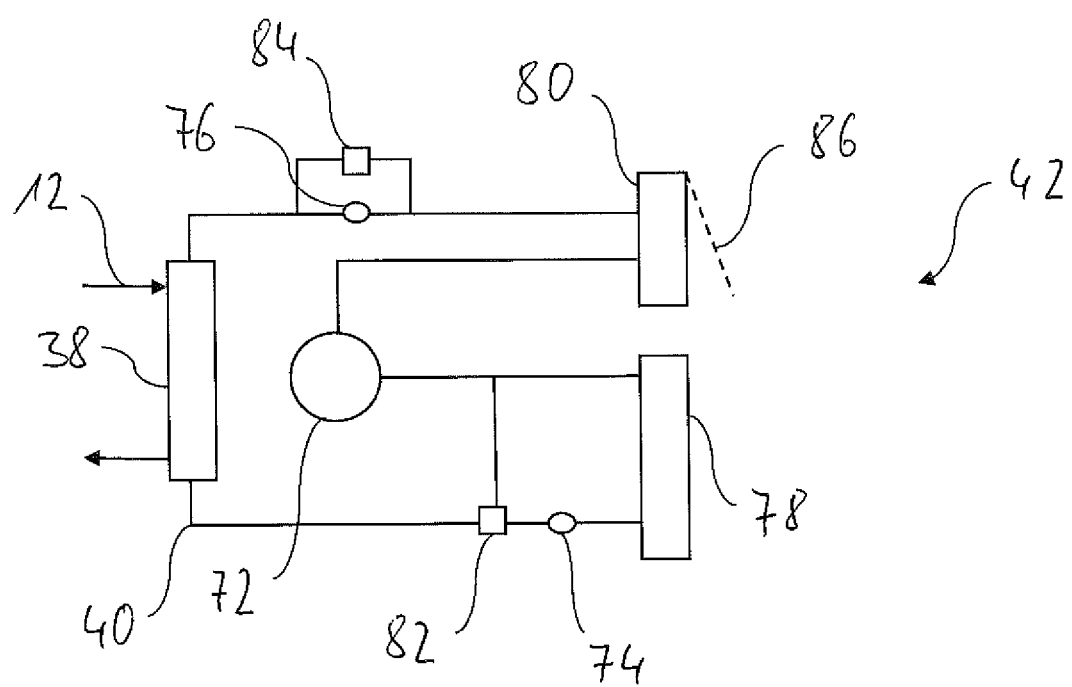
FIG. 2 is a schematic general view of a heat pump system for a vehicle.

FIG. 2 shows the third heat exchanger device 38, via which a thermal interaction of the first heat carrier medium in the first heat carrier medium circuit 12 with the second heat carrier medium in the second heat carrier medium circuit 40 can be provided. The second heat carrier medium in the second heat carrier medium circuit 40 is a refrigerant, which can be liquefied by increasing the pressure in a compressor 72 and passes over into a gaseous state again following a pressure drop in respective expansion valves 74, 76. Further, a cooling heat exchanger device 78 and a heating heat exchanger device 80 are associated with the second heat carrier medium circuit 40. Heat can be removed in the cooling heat exchanger device 78 from the air to be introduced into the interior of a vehicle, while heat can be transferred in the heating heat exchanger device 80 to the air to be introduced into the interior of the vehicle. On-off valves 82, 84 are provided in association with the two expansion valves 74, 76. The on-off valve 82 can be switched such that it releases a flow path to the expansion valve 74 and via this to the cooling heat exchanger device 78 or blocks this flow path and releases a flow path directly to the compressor 72 in the process. The on-off valve 84 may be switched such that it releases a flow path bypassing the expansion valve 76 or blocks it against flow.

In the cooling operation, the second heat carrier medium is compressed by the compressor 72 and delivered in the direction of the heating heat exchanger device 80. This is blocked in the cooling operation by a closing flap 86 against the flow of air, so that a heat transfer cannot take place in the heating heat exchanger device 80. The on-off valve 84 is in its switching state in which it releases the flow path around the expansion valve 76, so that the second heat carrier medium compressed by the compressor 72 and heated in the process flows through the on-off valve 84 while bypassing the expansion valve 76 and reaches via this on-off valve the third heat exchanger device 38, which acts as a condenser in this operating state. The second heat carrier medium can transfer heat there to the first heat carrier medium circulating in the first heat carrier medium circuit 12 and flow in the liquefied form to the expansion valve 74 via the on-off valve 82. The second heat carrier medium is evaporated at (following) the expansion valve 74 or in the cooling heat exchanger device 78 acting as an evaporator in this operating state, and the second heat carrier medium is cooled, so that the second heat carrier medium can absorb heat in the cooling heat exchanger device 78 from the air that flows through this cooling heat exchanger device 78 and is to be introduced into the interior of a vehicle, before the second heat carrier medium is compressed again in the compressor 72.

The on-off valve 82 is set in the heating operation such that it blocks a flow path in the direction of the cooling heat exchanger device 78, while the on-off valve 84 is switched such that it blocks the flow path bypassing the expansion valve 76. The second heat carrier medium, which is compressed by the compressor 72 and is heated in the process, releases heat to the air in the heating heat exchanger device 80, which acts as a condenser in this operating state and which releases now the flow of air by adjusting the closing flap 86, and the second heat carrier medium is cooled and liquefied in the process. The liquefied second heat carrier medium flows in the direction of the expansion valve 76, is liquefied there or in the third heat exchanger device 38, which then follows in the flow path and acts as an evaporator in this operating state, and it is cooled in the process. The second heat carrier medium can absorb heat from the first heat carrier medium in the third heat exchanger device 38, so that it can flow in an already heated state to the compressor 72 via the on-off valve 82.

During the operation of the vehicle temperature control system 10 shown in FIG. 1, the heater 18 may generate heat and transfer it to the first heat carrier medium either in the combustion operation or by electrical energization depending on whether heat shall be absorbed or heat shall be released in the heat pump system 42, so that this first heat carrier medium can transfer heat in the third heat exchanger device 38 to the second heat carrier medium in the second heat carrier medium circuit 40. If the heat pump system 42 is operated in the cooling operation, so that heat is to be removed via the third heat exchanger device 38, this heat can be transferred, with the heater 18 deactivated, via the first heat carrier medium and the second heat exchanger device 26 to the energy storage material 36, i.e., the operating material 24 or/and to the phase change material 34, in order to store energy there for later use. An additional heat exchanger device, in which heat can be transferred to the ambient air in the manner of a cooler provided in a conventional vehicle and can thus be removed from the second heat carrier medium, may, of course, be associated with the heat pump system 42 in addition to the third heat exchanger device 38, in which a heat exchange takes place between the second heat carrier medium and the first heat carrier medium. It would also be possible, in principle, to configure the third heat exchanger device 38 for the bypass of ambient air in order to integrate this functionality into the third heat exchanger device 38.

In order to ensure that the operating material tank 20 can be charged thermally repeatedly, i.e., that it is ready to absorb heat during phases of operation during which the vehicle temperature control system 10 shall be operated for cooling more often and over longer time periods, for example, in the summer, heat being stored in the operating material tank 20 can be released via the first heat carrier medium circuit 12 and the third heat exchanger 38 provided therein, for example, when a vehicle is not in operation. Provisions may be made to this end, for example, for heat to also be released via the heat exchanger 38 to the environment, i.e., not into the interior of the vehicle, which is to be cooled, in principle, during the operation. This process is preferably carried out at night, when lower ambient temperatures can be assumed. As an alternative or in addition, heat could be released via the heating heat exchanger 80 and a duct leading to the outside.

In the vehicle temperature control system 10, the operating material tank 20 with the operating material 24 or phase change material 34 contained in it is used as an energy storage device, which can be charged, on the one hand, by the thermal interaction of the second heat carrier medium with the first heat carrier medium or/and by the operation of the heater 18 and, on the other hand, it can release heat to the second heat carrier medium via the first heat carrier medium when heat is correspondingly needed. It thus becomes possible to operate the heat pump system 42 with a high efficiency even at comparatively high and comparatively low ambient temperatures, because it is connected via the third heat exchanger device 38 to the storage system provided in the area of the operating material tank 20 and it can thus introduce energy into this storage system or remove energy from this as needed.

Furthermore, the operating material 24 can be used not only as fuel for the heater 18 but also to optimize the wiper fluid or the fuel to be burned in an internal combustion engine, and thus to achieve a reduced pollutant emission. Since only comparatively small quantities of operating material 24 are necessary during the operation, the operating material tank 20 may be provided with a comparatively small storage volume in the range of 15 L to 20 L, so that refilling of operating material 24 is not necessary even over longer phases of operation. The operating material tank 20 is, of course, equipped with a compensating volume and vent openings, just as the wiper fluid tank 54 and the fuel tank 62, for adaptation to the changing level of the operating material 24 contained therein.

The vehicle temperature control system 10 may be provided as a modular system, a module indicated by the line L1 being suitable as a basic module both for use in an electric motor-powered vehicle and for use in a vehicle with an internal combustion motor, for example, a hybrid vehicle. In case of use in a vehicle equipped with an internal combustion engine, the temperature control system 10 also comprises, as is indicated by the line L2, the fuel tank 62, to which operating material may be delivered via the operating material reversing valve 52 as needed.

In the module outlined by the line L1, the heater 18 may also be configured, for example, as a purely electrical heater or as a heater operated with fuel only. The heater 18 may also be configured, in principle, as a module and have only the electrically energizable heating device 44 in a first, cost-effective level of expansion. The burner area 46 may be added as needed.

As was mentioned already, pure ethanol may advantageously be used as the operating material 24 during the operation of the vehicle temperature control system 10, because this is suitable for both combustion in the heater 18 and as an additive in the wiper fluid tank 54 and in the fuel tank 62.

It should finally be noted that, in particular, the heat pump system 42 shown in FIG. 2 is also shown only generally and was described with reference to its essential system areas. The configuration of this system can also be modified in many different aspects insofar as this is advantageous in adaptation to a particular intended purpose. Structural modifications may also be made in the area of the first heat carrier medium circuit. For example, heat generated in the area of an internal combustion engine and transported in the combustion waste gases thereof could thus be transferred to the first heat carrier medium and introduced via this into the energy storage material.

During operation in the summer, when, in particular, the addition of an additive lowering the freezing point of the wiper fluid is not necessary, it would be possible to use water as the operating material for cost reasons and for reasons of higher heat storage capacity.

While specific embodiments of the invention have been shown and described in detail to illustrate the application of the principles of the invention, it will be understood that the invention may be embodied otherwise without departing from such principles.

What is claimed is:

1. A vehicle temperature control system comprising:
    a heater operated electrically and/or with fuel, the heater comprising a first heat exchanger device for transferring heat provided in the heater to a first heat carrier medium provided in a first heat carrier medium circuit;
    an operating material tank configured to hold a liquid operating material;
    a second heat exchanger device configured to transfer heat between the first heat carrier medium provided in the first heat carrier medium circuit and energy storage material contained in the operating material tank;
    a third heat exchanger device configured to transfer heat between the first heat carrier medium provided in the first heat carrier medium circuit and a second heat carrier medium provided in a second heat carrier medium circuit;
    a heat pump system associated with the second heat carrier medium circuit;
    a cooling heat exchanger device associated with the second heat carrier medium circuit for absorbing heat from air to be introduced into a vehicle interior flowing through the cooling heat exchanger device in a cooling operation of the heat pump system;
    a heating heat exchanger device associated with the second heat carrier medium circuit for transferring heat to air to be introduced into the vehicle interior flowing through the heating heat exchanger device in a heating operation of the heat pump system, wherein the heat pump system is configured to transfer heat in an area of the third heat exchanger device from the second heat carrier medium to the first heat carrier medium in the cooling operation of the heat pump system and to absorb heat in the area of the third heat exchanger device from the first heat carrier medium in the second heat carrier medium in the heating operation of the heat pump system.

2. The vehicle temperature control system in accordance with claim 1, wherein the first heat carrier medium circuit comprises a heat carrier medium pump for delivering the first heat carrier medium through the first heat exchanger device, the second heat exchanger device and the third heat exchanger device.

3. The vehicle temperature control system in accordance with claim 1, wherein the energy storage material comprises operating material contained in the operating material tank, and the second heat exchanger device comprises a first heat exchanger area for transferring heat between the first heat carrier medium and the operating material contained in the operating material tank.

4. The vehicle temperature control system in accordance with claim 1, wherein:
    a phase change material energy storage device is provided in the operating material tank;
    the energy storage material comprises phase change material provided in the phase change material energy storage device; and
    the second heat exchanger device comprises a second heat exchanger area for transferring heat between the first heat carrier medium and the phase change material.

5. The vehicle temperature control system in accordance with claim 1, wherein an operating material pump is provided in an operating material line, the operating material pump being configured:
    to deliver operating material contained in the operating material tank as fuel to a burner area of the heater; or
    to deliver operating material contained in the operating material tank as a wiper fluid additive to a wiper fluid tank; or
    to deliver operating material contained in the operating material tank as a fuel additive to a fuel tank for an internal combustion engine; or
    for any combination of to deliver operating material contained in the operating material tank as fuel to a burner area of the heater, and to deliver operating material contained in the operating material tank as a wiper fluid additive to a wiper fluid tank, and to deliver operating material contained in the operating material tank as a fuel additive to a fuel tank for an internal combustion engine.

6. The vehicle temperature control system in accordance with claim 5, wherein an operating material reversing valve is provided in the operating material line downstream of the operating material pump.

7. The vehicle temperature control system in accordance with claim 6, wherein the operating material reversing valve is configured:
    to establish a connection between the operating material line and the burner area of the heater; or
    to establish a connection between the operating material line and the wiper fluid tank; or
    to establish a connection between the operating material line and the fuel tank; or
    for any combination of to establish a connection between the operating material line and the burner area of the heater, and to establish a connection between the operating material line and the wiper fluid tank, and to establish a connection between the operating material line and the fuel tank.

8. The vehicle temperature control system in accordance with claim 1, wherein the heater comprises an electrically energizable heating device for heating the first heat carrier medium in the first heat exchanger device.

9. The vehicle temperature control system in accordance with claim 8, wherein the electrically energizable heating device comprises a PTC heating device.

10. The vehicle temperature control system in accordance with claim 1, wherein the operating material contained in the operating material tank is ethanol or comprises ethanol.

11. The vehicle temperature control system in accordance with claim 1, wherein the operating material tank is enclosed with insulating material.

12. The vehicle temperature control system in accordance with claim 1, wherein:
the heat pump system has a cooling operation condenser for condensing the second heat transfer medium in the cooling operation of the heat pump system, the third heat exchanger device providing the cooling operation condenser in the cooling operation of the heat pump system; and
the heat pump system has a heating operation condenser for condensing the second heat transfer medium in the heating operation of the heat pump system, the heating heat exchanger device providing the heating operation condenser in the heating operation of the heat pump system.

13. The vehicle temperature control system in accordance with claim 1, wherein the second heat transfer medium circuit comprises a compressor for circulating the second heat transfer medium in the second heat transfer medium circuit through the third heat exchanger device, the cooling heat exchanger device, and the heating heat exchanger device.

14. A vehicle temperature control system comprising:
a first heat carrier medium circuit comprising a first heat carrier medium;
a second heat carrier medium circuit comprising a second heat carrier medium;
a heater operated electrically and/or with fuel, the heater comprising a first heat exchanger device configured to transfer heat provided in the heater to the first heat carrier medium provided in the first heat carrier medium circuit;
an operating material tank comprising an operating material tank interior space, wherein a liquid operating material and an energy storage material are provided in the operating material interior space;
a second heat exchanger device configured to transfer heat between the first heat carrier medium provided in the first heat carrier medium circuit and the energy storage material;
a third heat exchanger device configured to transfer heat between the first heat carrier medium and the second heat carrier medium;
a heat pump system associated with the second heat carrier medium circuit;
a cooling heat exchanger device associated with the second heat carrier medium circuit, the cooling heat exchanger device being configured to absorb heat from air to be introduced into a vehicle interior flowing through the cooling heat exchanger device in a cooling operation of the heat pump system;
a heating heat exchanger device associated with the second heat carrier medium circuit, the heating heat exchanger being configured to transfer heat to air to be introduced into the vehicle interior flowing through the heating heat exchanger device in a heating operation of the heat pump system, wherein the heat pump system is configured to transfer heat in an area of the third heat exchanger device from the second heat carrier medium to the first heat carrier medium in the cooling operation of the heat pump system and to absorb heat in the area of the third heat exchanger device from the first heat carrier medium in the second heat carrier medium in the heating operation of the heat pump system.

15. The vehicle temperature control system in accordance with claim 14, wherein the heater comprises an electrically energizable heating device for heating the first heat carrier medium in the first heat exchanger device.

16. The vehicle temperature control system in accordance with claim 14, wherein the cooling heat exchanger is located at a spaced location from the heating heat exchanger.

17. The vehicle temperature control system in accordance with claim 14, wherein the operating material contained in the operating material tank is ethanol or comprises ethanol.

18. The vehicle temperature control system in accordance with claim 14, wherein the operating material tank is enclosed with insulating material.

19. The vehicle temperature control system in accordance with claim 14, wherein:
the heat pump system has a cooling operation condenser for condensing the second heat transfer medium in the cooling operation of the heat pump system, the third heat exchanger device providing the cooling operation condenser in the cooling operation of the heat pump system; and
the heat pump system has a heating operation condenser for condensing the second heat transfer medium in the heating operation of the heat pump system, the heating heat exchanger device providing the heating operation condenser in the heating operation of the heat pump system.

20. The vehicle temperature control system in accordance with claim 14, wherein the second heat transfer medium circuit comprises a compressor for circulating the second heat transfer medium in the second heat transfer medium circuit through the third heat exchanger device, the cooling heat exchanger device, and the heating heat exchanger device.

* * * * *